(No Model.) 2 Sheets—Sheet 2.
G. WESTINGHOUSE, Jr.
ELECTRIC CONDUCTOR.
No. 366,361. Patented July 12, 1887.
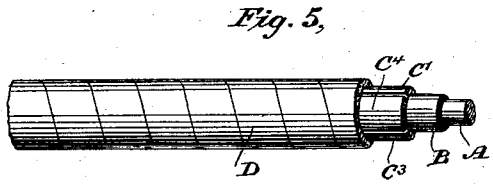
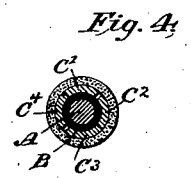

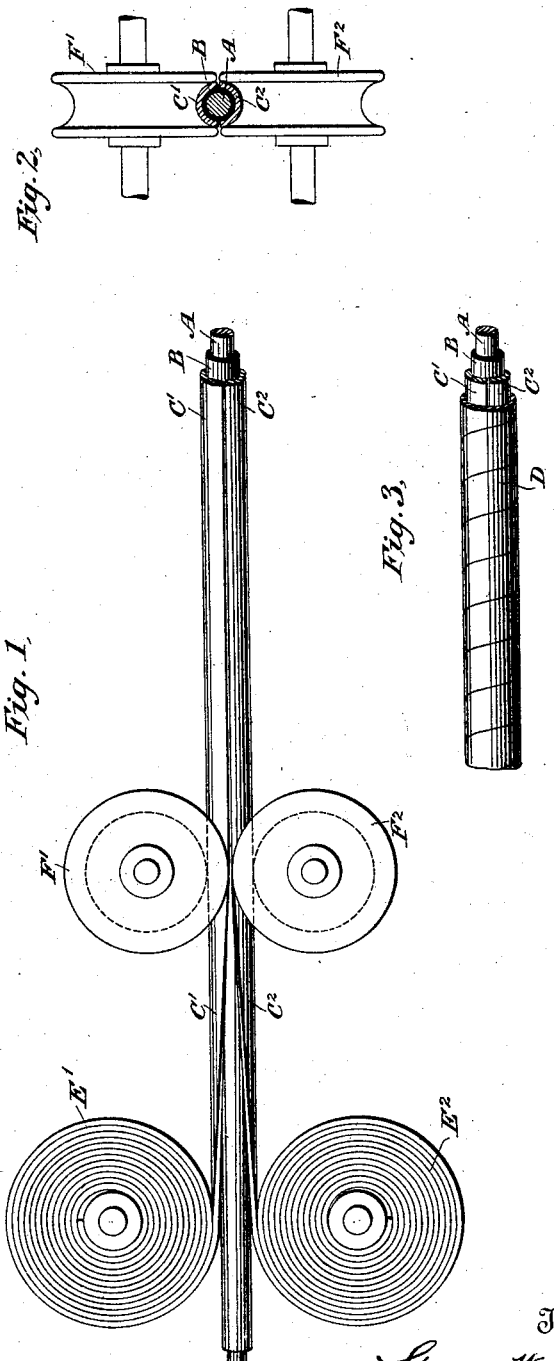

United States Patent Office.

GEORGE WESTINGHOUSE, JR., OF PITTSBURG, PENNSYLVANIA.

ELECTRIC CONDUCTOR.

SPECIFICATION forming part of Letters Patent No. 366,361, dated July 12, 1887.

Application filed November 23, 1886. Serial No. 219,640. (No model.)

*To all whom it may concern:*

Be it known that I, GEORGE WESTINGHOUSE, Jr., a citizen of the United States, residing in Pittsburg, county of Allegheny, and State of Pennsylvania, have invented certain new and useful Improvements in Electric Conductors, of which the following is a specification.

The invention relates to the construction of conductors or cables for electric light, telegraph, telephonic, and other electrical systems.

The object of the invention is to produce a conductor or cable for outgoing and return currents which may be easily manufactured and which affords perfect insulation between the individual conductors.

The complete cable consists of a central conducting-core surrounded by an insulating covering, which in turn is surrounded by a second conductor consisting of two strips or plates of conducting material applied to the opposite sides of the covered conductor and conforming in shape thereto. This is in turn covered with an insulating material, which serves at the same time to bind the plates together and thoroughly insulate them from surrounding objects.

The cable when finished may be soaked in any suitable non conducting substance, if it is found desirable.

In the accompanying drawings, Figure 1 is an elevation of the conductor in the process of manufacture, and Fig. 2 is a plan of the same. Fig. 3 is a section of the complete conductor. Figs. 4 and 5 are respectively an end view and a side view of a conductor having four separate curved plates.

Referring to the figures, A represents a copper or other conducting-wire. This is covered by an envelope, B, of insulating material of any suitable well known character—such, for instance, as fibrous matter permeated with pitch, paraffine, or other insulating material.

To the outside of the insulating-cover there are applied two or more plates, C' C², of conducting material, preferably copper. These extend upon opposite sides along the length of the insulated conductor. They are curved to the surface of the insulating-covering, being either previously prepared for that purpose or curved during the process of applying them. A convenient manner of accomplishing this is to pass insulated wires between two reels, E' E², upon which the plates C' C² are wound. The wire, together with the plates, is drawn between the mandrel-rollers F' and F², which serve to press the plates upon the covered wire and conform it to the surface thereof. The two plates may with advantage be in contact with each other throughout greater or less portions of their lengths. The entire conductor is then covered by a suitable insulating-covering, D. This is woven, wrapped, or otherwise applied in any convenient manner.

It is not essential that the conducting-plates C' C² be applied in the manner described; but other machines and methods of applying them may be employed.

The entire cable when completed may be soaked in any suitable insulating compound, and this will permeate not only the covering D but also penetrate between the plates C' and C² to the covering B.

Instead of two plates C' or C² there may be three or more applied to the outer surface of the covering B. In Figs. 4 and 5 such a conductor is illustrated. There are here shown plates applied to the central conductor, A, outside the insulating covering B, four curved plates of conducting material, C', C², C³, and C⁴. These are incased by the outer covering, D.

I claim as my invention—

1. The combination of a central conductor, a covering of insulating material, and two or more independent conducting-plates applied to the opposite sides of the same and curved to conform to the surface thereof.

2. An electric conductor consisting of a central conducting-core, an outer conductor constructed in longitudinal sections curved to conform thereto, and an intervening insulating material.

3. An electric cable or conductor consisting of a central core, an outer conductor in longitudinal sections curved to conform thereto, an insulating material between the two, and an external covering.

In testimony whereof I have hereunto subscribed my name this 4th day of November, A. D. 1886.

GEO. WESTINGHOUSE, JR.

Witnesses:
CHARLES A. TERRY,
J. G. BACKOFEN.